(12) United States Patent
de Icaza et al.

(10) Patent No.: US 9,183,020 B1
(45) Date of Patent: Nov. 10, 2015

(54) MULTI-SIZED DATA TYPES FOR MANAGED CODE

(71) Applicant: Xamarin Inc., San Francisco, CA (US)

(72) Inventors: Miguel de Icaza, Boston, MA (US);
Rodrigo Kumpera, Boston, MA (US);
Sebastien Pouliot, Quebec City (CA);
Rolf Bjarne Kvinge, Madrid (ES);
Aaron Dean Bockover, Raleigh, NC (US); Zoltan Varga, Budapest (HU)

(73) Assignee: Xamarin Inc., San Francisco, CA (US)

( * ) Notice: Subject to any disclaimer, the term of this patent is extended or adjusted under 35 U.S.C. 154(b) by 0 days.

(21) Appl. No.: 14/537,298

(22) Filed: Nov. 10, 2014

(51) Int. Cl.
*G06F 9/45* (2006.01)
*G06F 9/455* (2006.01)

(52) U.S. Cl.
CPC ............. *G06F 9/4552* (2013.01); *G06F 8/41* (2013.01); *G06F 8/437* (2013.01)

(58) Field of Classification Search
CPC .... G06F 8/437; G06F 9/4552; G06F 9/45525
USPC .......................................... 717/146–148, 152
See application file for complete search history.

(56) References Cited

U.S. PATENT DOCUMENTS

| | | | |
|---|---|---|---|
| 5,280,617 A | 1/1994 | Brender et al. | |
| 5,493,675 A | 2/1996 | Faiman, Jr. et al. | |
| 6,389,590 B1 * | 5/2002 | Miller et al. | 717/140 |
| 8,006,239 B2 | 8/2011 | Sankaranarayanan et al. | |
| 8,245,210 B2 | 8/2012 | Ng et al. | |
| 2003/0093780 A1 | 5/2003 | Freudenberger et al. | |
| 2003/0126590 A1 | 7/2003 | Burrows et al. | |
| 2005/0132328 A1 | 6/2005 | Bulusu | |
| 2008/0320453 A1 | 12/2008 | Meijer et al. | |
| 2010/0287536 A1 | 11/2010 | Chung et al. | |

OTHER PUBLICATIONS

Office Communication for U.S. Appl. No. 14/337,064 mailed on Sep. 9, 2014.
Achten et al., "When Generic Functions Use Dynamic Values", 2002, Proceedings of the 14th International Conference on Implemention of Functional Languages, pp. 17-33.
Office Communication for U.S. Appl. No. 14/337,064 mailed on Sep. 9, 2014 (21 pages).

(Continued)

*Primary Examiner* — Ryan Coyer
(74) *Attorney, Agent, or Firm* — John W. Branch; Lowe Graham Jones PLLC

(57) ABSTRACT

Embodiments are directed towards generating applications that include multi-sized types running in managed code. During the compilation of an intermediate language version of an application, if a multi-size type is encountered, a runtime engine may perform actions to process the multi-size types. Accordingly, architecture information associated with the target computer may be determined. Data types corresponding to the architecture of the target computer and the multi-sized types may be determined based on the architecture information. Native code calls associated with an intermediate language code calls may be determined such that the parameters of the native code calls match the architecture dependent data types. And, a machine code version of the intermediate language code call may be generated. The generated machine code version of the intermediate language code may be executed with the data types specific to the target computer.

30 Claims, 7 Drawing Sheets

(56) References Cited

OTHER PUBLICATIONS

Achten, P. et al., "When generic functions use dynamic values," 2002 Proceedings of the 14th International Conference on Implementation of Functional Language, Lecture Notes in Computer Science, (2003) pp. 17-33.

Office Communication for U.S. Appl. No. 14/337,064 mailed on Feb. 23, 2015.

Office Communication for U.S. Appl. No. 14/337,064 mailed on May 12, 2015.

Office Communication for U.S. Appl. No. 14/670,218 mailed on May 27, 2015.

* cited by examiner

| Native Type | 32-bit Backing Type | 64-bit Backing Type |
|---|---|---|
| System.nint | int: System.Int32 | long: System.Int64 |
| System.nuint | uint: System.UInt32 | ulong: System.UInt64 |
| System.nfloat | float: System.Single | double: System.Double |

*Fig. 5*

MULTI-SIZED DATA TYPES FOR MANAGED CODE

TECHNICAL FIELD

This invention relates generally to software application development, and more particularly, but not exclusively, to generating applications for hardware platforms that have different architectures.

BACKGROUND

A highly competitive application marketplace puts tremendous pressure on application developers to deliver high quality user experiences for both consumers and employees across a wide variety of computing platforms. Accordingly, it may be advantageous to employ modern cross-platform software development tools to enable application developers to develop applications for a variety of target platforms. Thus, in some cases, application developers may write the source code for their applications in one computer programming language and deploy compiled applications to multiple platforms. However, some computing platforms may include unique and/or distinctive native interfaces that may reduce and/or limit the ability for writing platform agnostic programs. In particular, some native application programming interfaces may obscure architectural details that may be important to improve cross platform development. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the present innovations, reference will be made to the following Description of the Various Embodiments, which is to be read in association with the accompanying drawings, wherein.

DESCRIPTION OF THE VARIOUS EMBODIMENTS

Figure 1:
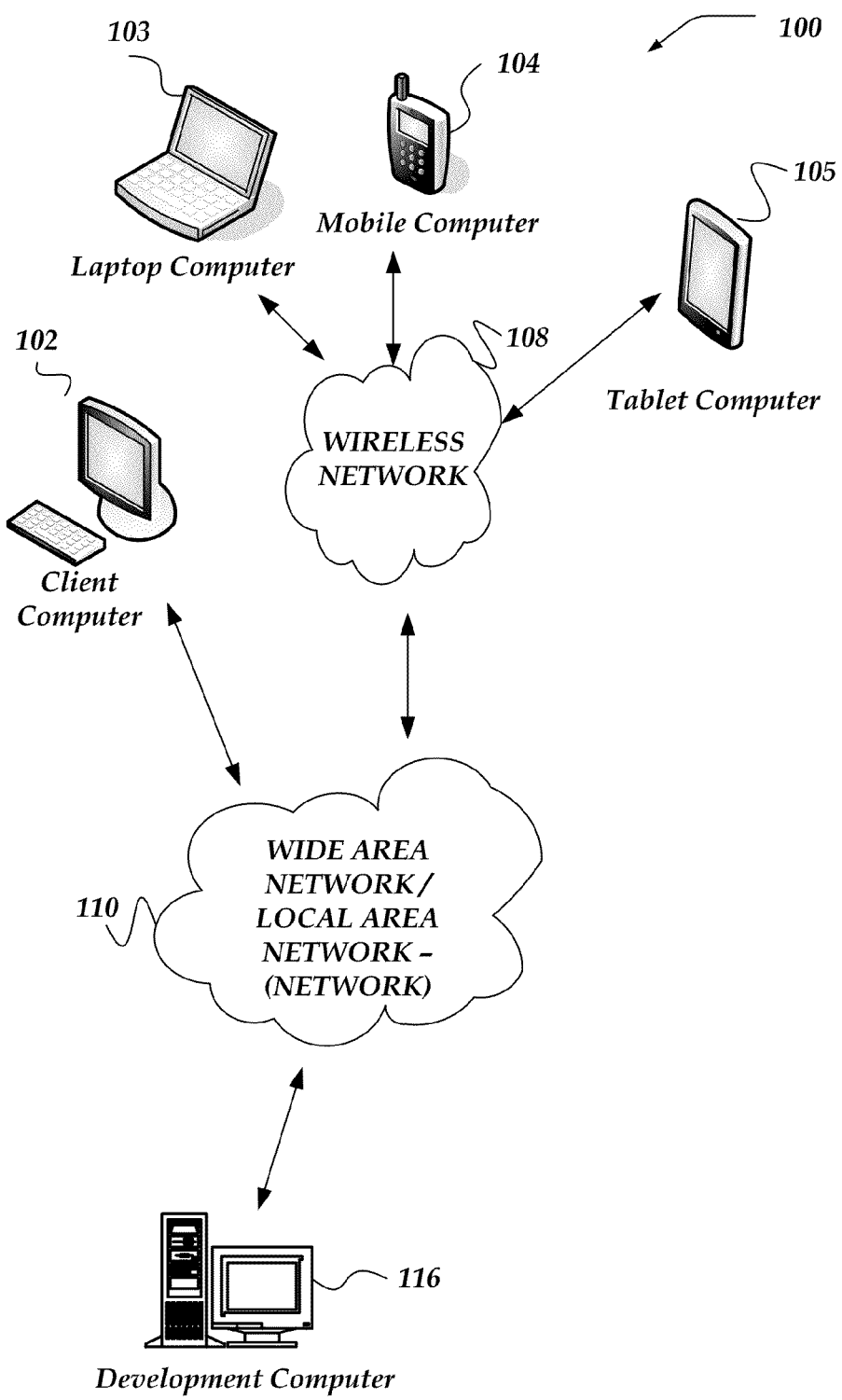
FIG. 1 illustrates a system environment in which various embodiments may be implemented.

The present innovations now will be described more fully hereinafter with reference to the accompanying drawings, which form a part hereof, and which show, by way of illustration, specific embodiments by which the innovations may be practiced. These innovations may, however, be embodied in many different forms and should not be construed as limited to the embodiments set forth herein; rather, these embodiments are provided so that this disclosure will be thorough and complete, and will fully convey the various embodiments to at least those skilled in the art. Among other things, the present innovations may be embodied as methods, computers, or devices. Accordingly, the embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "application" as used herein refers to a computing/software application designed to operate on a computer. While the term application is used throughout this description, one of ordinary skill in art the will appreciate that various types of applications may benefit from these innovations and are well within the scope and spirit of the disclosed innovations, including, but not limited to, mobile applications, web applications, web pages, "desktop" applications, or the like.

The term "application developer" as used herein refers to users that design and develop applications. Application developers may create and deploy applications.

The term "computer" as used herein refers to networked computers and may include tablet computers, handheld computers, wearable computers, desktop computers, or the like. Mobile computers may also include notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding computers, or the like.

The terms "target platform," "target computer" as used herein refer to computers, such as, mobile computers, client computers, smart televisions, game consoles, set-top cable boxes (for televisions), smart home appliances, or the like, upon which applications are intended to be deployed. In at least one of the various embodiments, source code for an application may be compiled into machine code that is compatible for execution on one or more target computers. Different types of target computers may require compilers to generate machine code that is particular to the machine architecture of the particular target computers.

The terms "machine code," "machine code instructions," and "native code" as used herein refers to symbols representing instructions that have been generated by compiling source code. Machine code comprises instructions designed for execution by a CPU complex of a target computer. Further, machine code may be instructions that may be executed directly on a target computer without alteration. Also, the data employed by an application may be included with the machine code. In some cases, a compiler and/or other application development program may supply or generate machine code that is not directly compiled from the source code. In some cases, the machine code may include call to application programmer interfaces provided by the target computer. These APIs may be provided at an operating system and/or user-interface framework level rather than being limited to low level CPU instructions. For example, machine code may include system calls generally considered to be performing high level operations, such as, managing UI elements/objects, networking, UI message handling, file I/O, math functions, memory management, or the like.

The terms "intermediate language code", "intermediate language" as used herein refer to the code symbols and information that may be generated by compiling source code using a compiler. For cross-platform development system, intermediate language code may be platform independent. Intermediate language is further compiled into machine code for execution on a target computer by an ahead-of-time compiler or a runtime engine performing just-in-time compiling on the target computer.

The term "parameter" as used herein refers to a variable and/or variable name that is included either explicitly or implicitly in the definition of a function. The precise syntax of parameters will vary depending on the particular programming language that is being employed. In at least one of the various embodiments, the parameters defined for a function may be employed by a compiler to generate an identifier and/or signature for the particular function. Accordingly, in some programming languages, function having the same name may be distinguishable because they are defined using different parameters.

The term "return value" as used herein refers to a variable that is passed out of function (e.g., returned) after it runs to completion. Note, depending on the programming language, return values for functions may be optional.

The term "parameter type" as used herein refers to the type of data type represented by a defined parameter. In at least one of the various embodiments, parameters are often defined to represent a specific/particular data type. Accordingly, a compiler may be arranged to confirm in source code whether arguments having the correct/specified argument types are passed as arguments to functions. In generic programming, one or more parameter types may be passed to as arguments to generic functions. During runtime and/or compilation of the application source code, the parameter type arguments may be determined enabling the runtime environment and/or the compiler to generate a type specific machine code version of the generic function.

The terms "multi-size data type", and "multi-size type" as used herein refer to data types used in source code and intermediate language code that may represent data type of indeterminate size. The actual size of the data type may be determined during just-in-time compiling by a runtime engine and/or AOT compiling by a compiler. Multi-size types are described in detail below.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards cross platform development tools that enable application developers to target more than one target platform using that same source code when developing applications. Further, some cross-platform development environments enable application developers to use the familiar programming language and development environment to development applications for different target platforms and/or target computers.

In at least one of the various embodiments, compiling the intermediate language version of the application into a machine code version of the application may include generating the machine code version using a runtime engine that executing on the target computer, such that the runtime engine may enable just-in-time compilation of the machine code version of the application.

In some cases, the differences between two or more target platforms may be obscured by the target platforms and/or the target platform programming interfaces. For example, if two target computers have different word sizes (e.g., 32-bit versus 64-bit) they may be similar in many ways except for the sizes of data types used to access the native code. Also, for some target platforms if machine code generated by the cross-platform development environment includes mismatch native code calls the application may crash, or otherwise produce an error, during execution or code generation of the application. In some cases, the potential for mismatch may not be discovered until runtime. Thus, if there is possibility of an architectural mismatch occurring developers may generate an application for each possible target computer architecture. However, this may be disadvantageous because it may produce multiple application versions to manage and distribute, as well, as the administration effort required to deploy the correct version for a given target computer.

Accordingly, in at least one of the various embodiments, source code used by a cross-platform development environment may be innovatively arranged to include multi-size data types. The multi-sized data type may be employed in the source code for cross-platform development and then during runtime a runtime engine may determine the correct data types to employ based on the architecture of the target computer. For example, source code used for a cross platform development system may be arranged to have multi-sized types referred to as native types. Here they are called native types because during runtime they may take the form of a data type corresponding to the architecture of the target computer. Thus, if where there is a possibility of architectural mismatch (e.g., word size differences) occurring on target computer, the application programmer may employ the multi-size native types in the source code. Accordingly, during the execution of the application, the runtime engine may replace the multi-size native types with the actual data types that support the architecture of the target computer.

Furthermore, briefly stated, various embodiments are directed towards embodiments are directed to generating applications that include multi-sized types that may be running in managed code. In at least one of the various embodiments, during the compilation of an intermediate language version of an application into a machine code version of the application, if a multi-size type is encountered or used in an intermediate language code, a runtime engine and/or an AOT compiler may perform various actions to process the multi-size types. In at least one of the various embodiments, the multi-size type may be a field embedded in a data structure.

Further, in at least one of the various embodiments, the multi-size type may corresponds to one of a, an integer, an unsigned integer, or a floating value.

In at least one of the various embodiments, architecture information associated with the target computer may be determined such that the architecture information includes at least a word size of the target computer. In at least one of the various embodiments, determining the word size of may include determining the word size to be at least one of 16-bits, 32-bits, 64-bits, or the like.

In at least one of the various embodiments, one or more data types corresponding to the architecture of the target computer and the multi-sized types may be determined based on the architecture information of the target computer.

In at least one of the various embodiments, one or more native code calls associated with the intermediate language code call may be determined such that the parameters of the one or more native code calls match the architecture dependent data type. In at least one of the various embodiments, determining the one or more native code call associated with the intermediate language code call may be based on a pattern match that includes the data types and the name of the native code call.

In at least one of the various embodiments, a machine code version of the intermediate language code call may be generated that corresponds to the architecture information of the target computer. In at least one of the various embodiments, the generated machine code version of the intermediate language code call may include a portion of machine code that corresponds to a calling convention supported by the target computer.

In at least one of the various embodiments, when the target computer enables just-in-time compiling, the generated machine code version of the intermediate language code may be executed with at least one value of the multi-size types and the one or more data types specific to the target computer.

In at least one of the various embodiments, when the target computer disables just-in-time compiling, the generated machine code version of the intermediate language code may be inserted in the machine code version of the application with at least one value of the multi-size types and the one or more data types as determined for the target computer.

In at least one of the various embodiments, the intermediate language code may be generated from at least one source code file, such that the intermediate language code is deployable to a plurality of target platforms having different architectures.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Development Computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Development Computer 116, or other computers.

Client computers 102-105 may further be configured to include a client application that enables an end-user to log into an end-user account that may be managed by another computer, such as Development Computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, Development Computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of Development Computer 116 is described in more detail below in conjunction with FIG. 3. Briefly, however, Development Computer 116 includes virtually any network computer capable of performing actions for generating applications for a client computer.

Although FIG. 1 illustrates Development Computer 116 as a single computer, the innovations and/or embodiments are not so limited. For example, one or more functions of Development Computer 116 may be distributed across one or more distinct network computers. Moreover, Development Computer 116 is not limited to a particular configuration such as the one shown in FIG. 1. Thus, in one embodiment, Development Computer 116 may be implemented using a plurality of network computers and/or client computer. In other embodiments, development computer may operate as a plurality of network computers within a cluster architecture, a peer-to-peer architecture, or the like. Further, in at least one of the various embodiments, Development Computer 116 may be implemented using one or more cloud instances in one or more cloud networks.

Illustrative Client Computer

Figure 2:
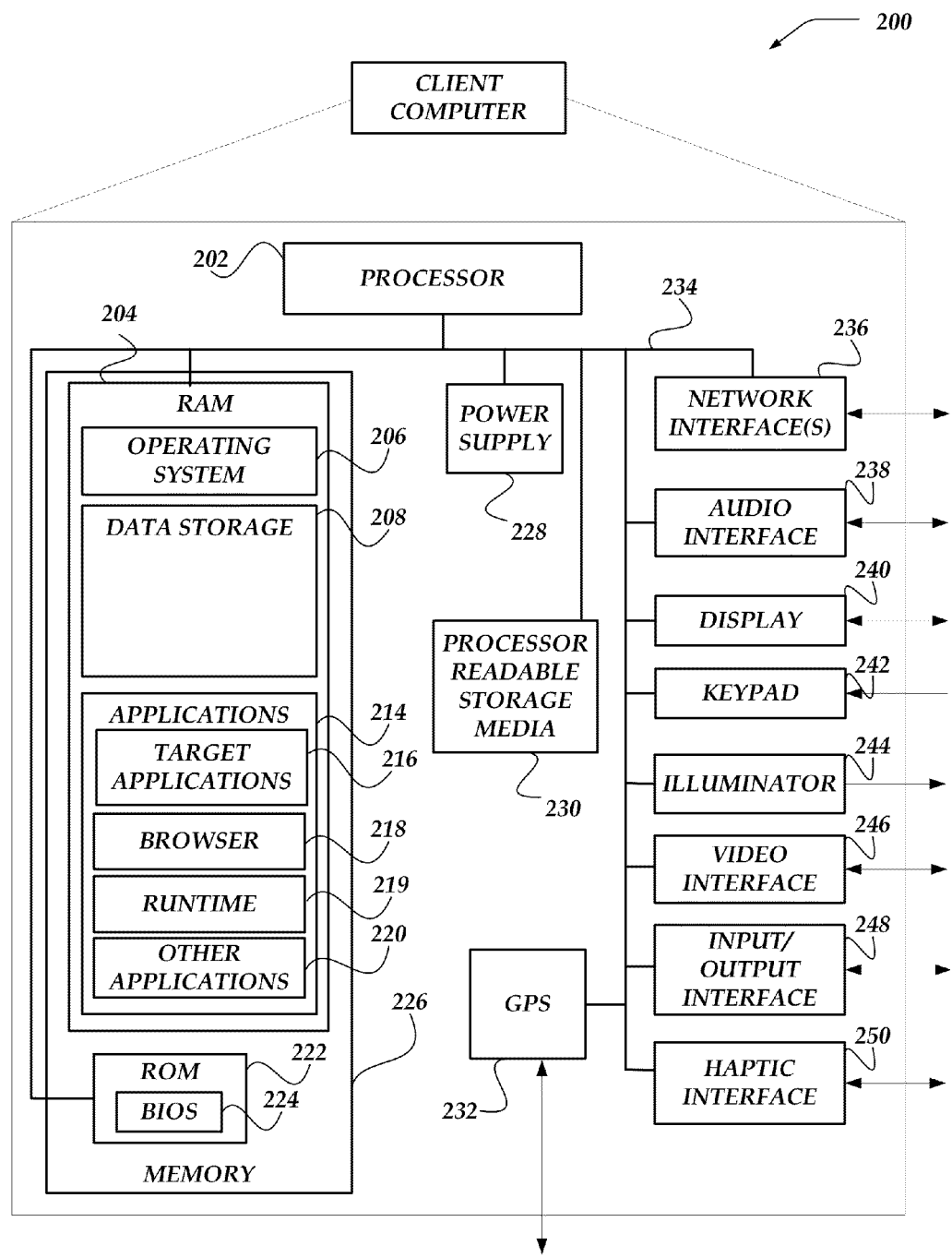
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220. Further, applications 214 may include one or more target applications 216 generated by a development computer. Further, in embodiments enables to runtime compile intermediate language code, runtime 219 may be included for processing intermediate language code into native operations on client computer 200.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as Development Computer 116 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
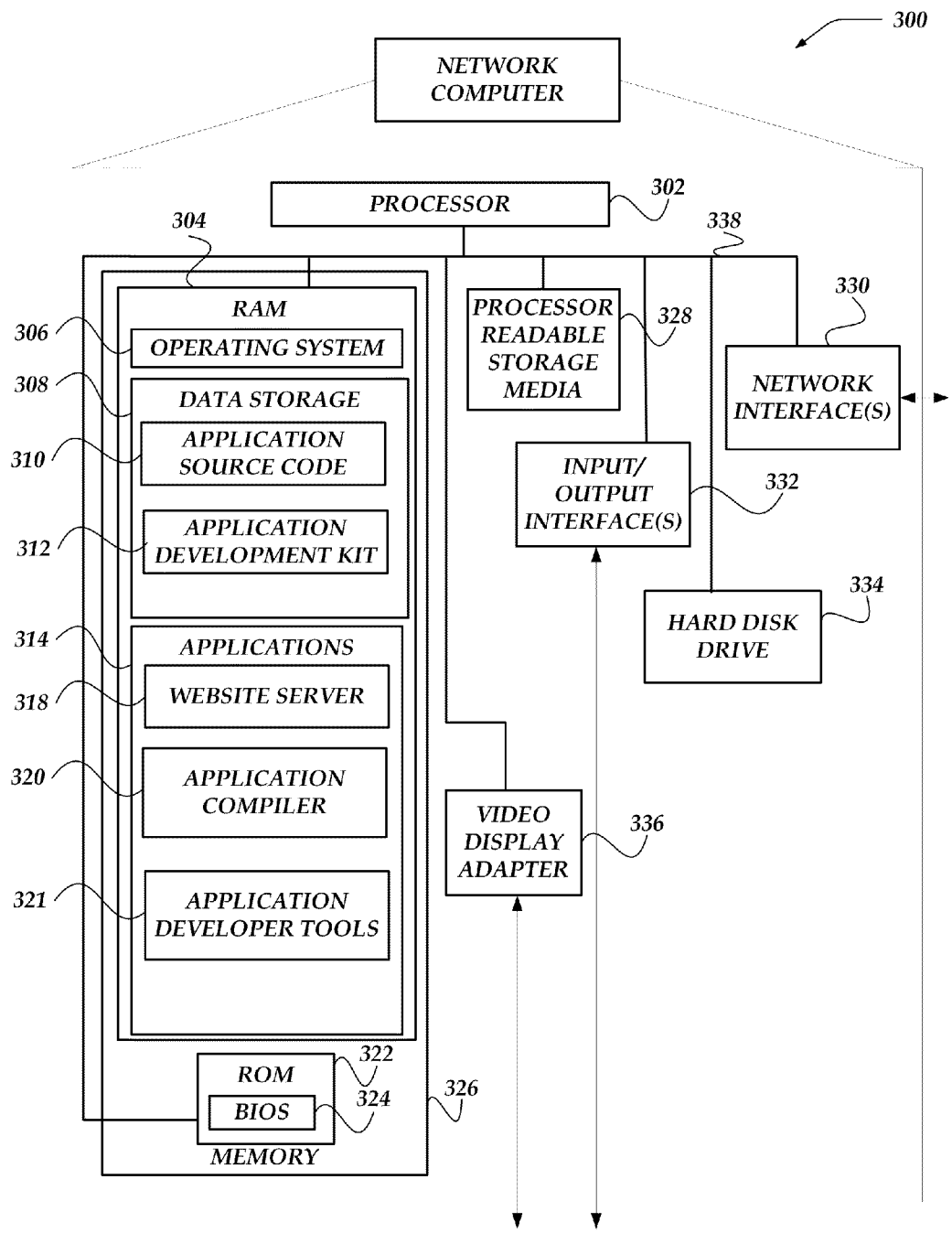
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example Development Computer 116, and/or other network computers.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may include application source code 310. In at least one of the various embodiments, application source code 310 may include information, such as, one or more files, resources, projects, or the like, used for generating intermediate language code and/or executable applications. Also, in at least one of the various embodiments, data storage 308 may include, one or more of application development kits 312 representing information and/or tools for generating intermediate language code and/or executable applications targeted for one or more target platforms.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, application compiler 320 for performing actions for generating executable applications for one or more target platforms.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Architecture

Figure 4A:
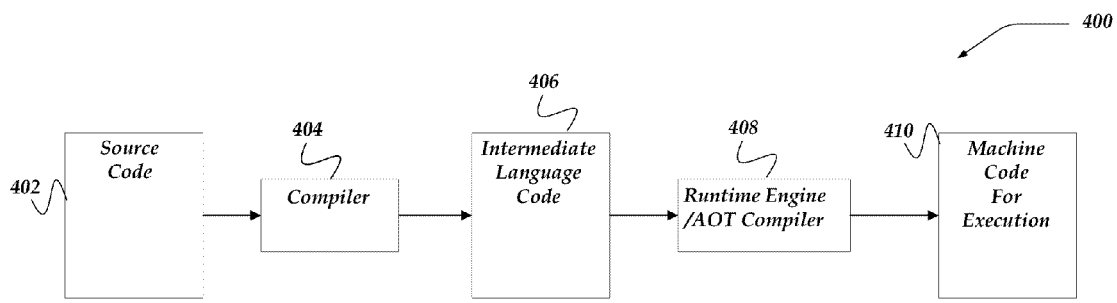
FIGS. 4A and 4B illustrate logical representations of the compiling a source code file into intermediate language code and/or machine code for deployment and execution on a target computer.
Figure 4B:
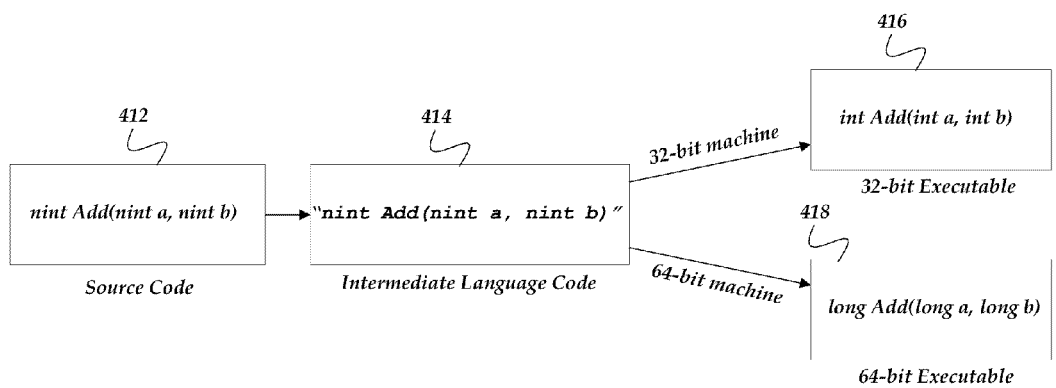

FIGS. 4A and 4B illustrate logical representations of the compiling a source code file into intermediate language code and/or machine code for deployment and execution on a target computer. In at least one of the various embodiments, application developer tools 321 and/or application compiler 320 may be arranged to include one or more of the tools and facilities that enable software programmers to create and generate applications. For example, source code editors, compilers, linkers, software development kits, libraries, user interface design tools, or the like, or combination thereof.

In at least one of the various embodiments, system 400 comprises components and stages for developing software applications targeted to one or more computers, such as, mobile computers, client computers, game consoles, set-top television boxes, smart televisions, media broadcasting appliances, or the like. In at least one of the various embodiments, the logical components of system 400 may be provided by development computers, such as, network computer 300 it may be a network computer or a client computer that is arranged to include tools and facilities that enable software programmers/application developers to create and generate applications for one or more target computers/devices.

FIG. 4A shows a logical schematic for system 400 for generating executable machine code from a source code file using one or more software development applications/tools, such as a compiler, in accordance with at least one of the various embodiments. In at least one of the various embodiments, source code 402 may represent one or more files, documents, or resources, for a software application or one or more portions of a software application. In at least one of the various embodiments, source code 402 may include one or more files of human readable/editable source code composed in one or more computer programming languages. Source code 402 may include high level instructions for performing one or more specific actions (a computer program) on a processor device, such as, processor 202, processor 302, or the like.

In at least one of the various embodiments, compiler 404 may represent one or more applications used for generating intermediate language code 406 from provided source code, such as, source code 402. In at least one of the various embodiments, compiler 404 may comprise application compiler 320, application developer tools 321, cross-platform development tools, or the like, or combination thereof.

In at least one of the various embodiments, intermediate language code 406 may represent source code that is compiled into a platform independent instructions that may be executed by a runtime engine, such as, runtime engine 408. In at least one of the various embodiments, intermediate language code 506 represents a collection of instructions and data for an application that may be installed on a target computer and executed by a runtime engine. In at least one of the various embodiments, the instructions included in intermediate language code 506 may include architecture/machine independent instructions for implementing/executing the instructions described in source code 402.

In at least one of the various embodiments, runtime engine 408 may be arranged to take intermediate language code and perform Just-In-Time compiling into machine code for execution on a target platform. Runtime engine 408 may be arranged to include platform specific characteristics that enable runtime engine 408 to execute instructions on a target platform. Runtime engines may be arranged to support target computers that may have different machine/processor architectures. One of ordinary skill in the art will be familiar with the general process of compiling source code into intermediate language code for execution by a runtime engine for a target computer.

In at least one of the various embodiments, some target platforms may restrict JIT compiling of machine code. Accordingly, intermediate language code 406 may be pre-compiled (e.g. Ahead-of-Time compiling) into executable machine code that may be deployed directly to the target computer.

In at least one of the various embodiments, machine code 410 may represent instructions that may be executed on a target computer. In at least one of the various embodiments, machine code 410 represents a collection of instructions and data for an application that may be installed and/or executed by a target computer. For target computer that enables JIT compiling, the machine code may be generated as needed, or on the fly, by a runtime engine. In contrast for target computers that require AOT compiling, machine code 401 may be generated and installed directly on that target computer. In these cases, intermediate language code 406 and runtime engine 408 are not installed on the target computer.

In at least one of the various embodiments, the instructions included in machine code 410 may include architecture/machine specific instructions for implementing/executing the instructions described in source code 402. Machine code targeted for target computers that have different machine/processor architectures may each represent the same source code instructions differently since they are based on instruction sets that may vary depending on the target computer's architecture. One of ordinary skill in the art will be familiar with the general process of compiling source code into machine code where the same source code may produce different machine code depending on the architecture of the target computers.

FIG. 4B shows a logical representation of generating at least a portion of machine code 410 in accordance with at least one of the various embodiments. In at least one of the various embodiments, source code files may include various elements and/or features for describing the instructions for implementing an application, such as the definition of functions. One of ordinary skill in the art will be familiar with the variety of ways how functions may be represented in source code using one or more programming languages. In this example, source code 402 includes a functions, such as, source code function 412. In this example, source code function 412 includes a function for adding two integers. Function 412 has parameters types and a return value shown here using a common convention in many programming languages.

In at least one of the various embodiments, function 412 may be considered to be a platform independent representation of an operation that an application want the application to perform. Accordingly, a compiler and/or runtime engine must be able to generate target computer specific machine code for the function. In some embodiments, function 412 may be implemented various computer programming languages, such as, C#, C, C++, Java, or the like. Here function 412 is represented as more or less in a C-style that may be compatible with many programming languages. Note, one of ordinary skill in the art will appreciate that for many programming languages the source code representation of a function may vary depending on the specification of the programming. However, the innovations described herein are not limited to a particular programming language. The innovations may apply to any programming language that may represent target independent functions that may be compiled into target specific machine code—either JIT compiled or AOT compiled.

Returning to this example, function 412 is a function for summing two integers (a and b) and returning the result. In this example, values provided as parameters to function 412 have an explicit type requirement, defined here as "nint" indicating that the parameters passed to function 412 must be integers. However, in some target computer architectures one or more native data types may vary depending on characteristics of the target platform. For example, in some targets an integer may be represented by 32-bit while in others it may be represented by 64-bits. Accordingly, depending on the target computer, a single type definition in the source file may correspond to different native target types depending on the characteristics of the target computer. Typically, the differences may be seen on using when the machine word width size of the target computer may be different.

For example, Apple Computer platforms may employ parameters having types such as NSInteger, NSUInteger, CGFloat, or the like, almost exclusively in their APIs. Accordingly, machine code generated by a runtime engine using such native APIs must also be generated to use these types, otherwise there may be a type-mismatch error during compiling and/or code generation. However, the underlying low level data type value for these types may vary depending on if the target machine is 32-bit or 64-bit. For example, the integral types are typedefs of the long C type, which is 32-bits or 64-bits in size. Likewise, CGFloat is a C float on 32-bit and a C double on 64-bit machines.

In at least one of the various embodiments, to avoid mismatches caused by different types sizes for different target computers, a set of types may be defined for use in the source code that may be used instead of architecture dependent types. In at least one of the various embodiments, since these types are employed to replace one or more native types they may be referred to as native types and/or multi-size types. For example, in at least one of the various embodiments, multi-size types may include, "nint" for signed integers, "nuint" for unsigned integers, "nfloat" for representing floating point values, and so on. One of ordinary skill are will appreciate that the scope of these innovations include more or fewer kinds of data and are not limited to integers, unsigned integers and floating point values. Accordingly, more or fewer data types may have correspondent multi-size types. Also, as discussed below multi-size type analogs for various data structures and/or objects that include fields that are architecture dependent may be provided as well.

Accordingly, in at least one of the various embodiments, anywhere an architecture dependent type may be used in a target computer's native code API, an appropriate native type, such as nint, nuint, or nfloat, may be used.

In at least one of the various embodiments, function 412 may be compiled from source code into intermediate language, represented by intermediate language code function 414. Code generating computing environments may produce intermediate language code that is specific the particular code generating computing environment. For example, Java source code may be compiled into an intermediate language known as Java byte-code for execution by a Java Virtual Machine. Likewise, cross platform development systems and/or code generation computing environments that support the C# language may often be arranged to compile source code into intermediate language code compatible with Common Intermediate Language (CIL). Generally, a compiler, (compiler 404) will be provided source code and produce intermediate language code. The specifics of the intermediate language are not shown in function 414. Though it may be assumed that it will be compatible with the runtime engine and/or AOT compiler used in the computing environment.

However, in at least one of the various embodiments, intermediate language code function 414 will include the native type as defined in the source code. This enables a program that is compiled into intermediate language code to avoid having target computer specific information included in the intermediate language code. As described above, the runtime engine that executes the intermediate language version of the program will be arranged to accommodate the particular architecture of the target computer at runtime.

In at least one of the various embodiments, if the intermediate language code includes native types for representing types that may be architecture dependent, the runtime engine may be arranged to replace the indefinite native type with a particular type for the particular architecture. Accordingly, the platform/architecture independent intermediate language code function, function 414, may be processed by a runtime engine to produce platform/architecture machine code that conforms to the type restrictions and calling conventions of the target computer.

For example, if the runtime engine is on a machine with a 32-bit architecture it may produce a function such as function 416, where the native type (nints in this example) are replaced with the appropriate target computer type. Accordingly, in this example, for function 416 the nints are replaced with ints (assuming that the "int" type represents 32-bit signed integers for the target platform). Also, in this example, machine code function 418 is generated/executed for a target platform with 64-bit architectures, where 64-bit signed integers are represented by the 'long' data type.

Figure 5:
FIG. 5 shows a table as an example of mapping platform independent native types to target platform types in accordance with at least one of the various embodiments.
Figure 6:
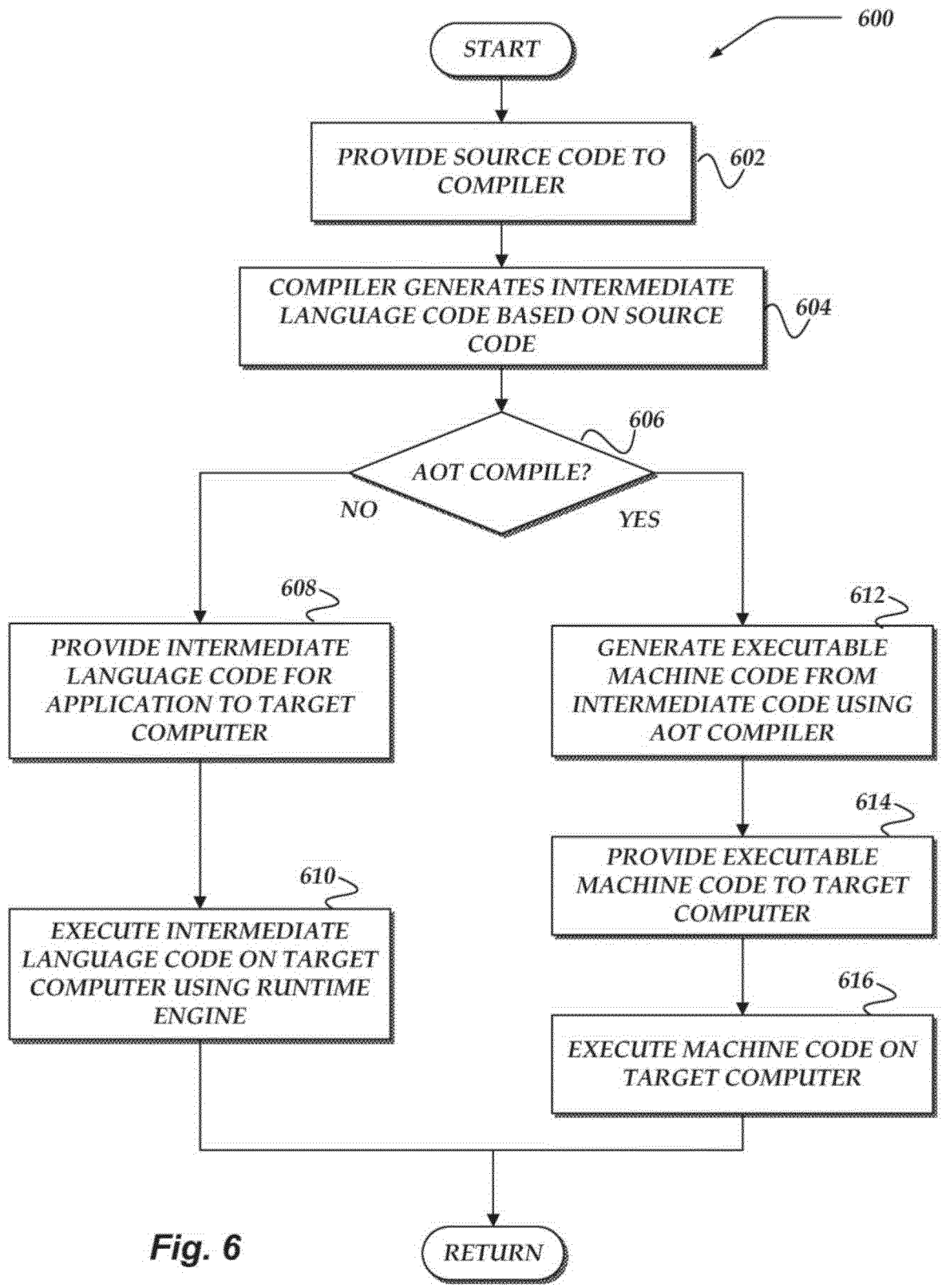
Figure 7:
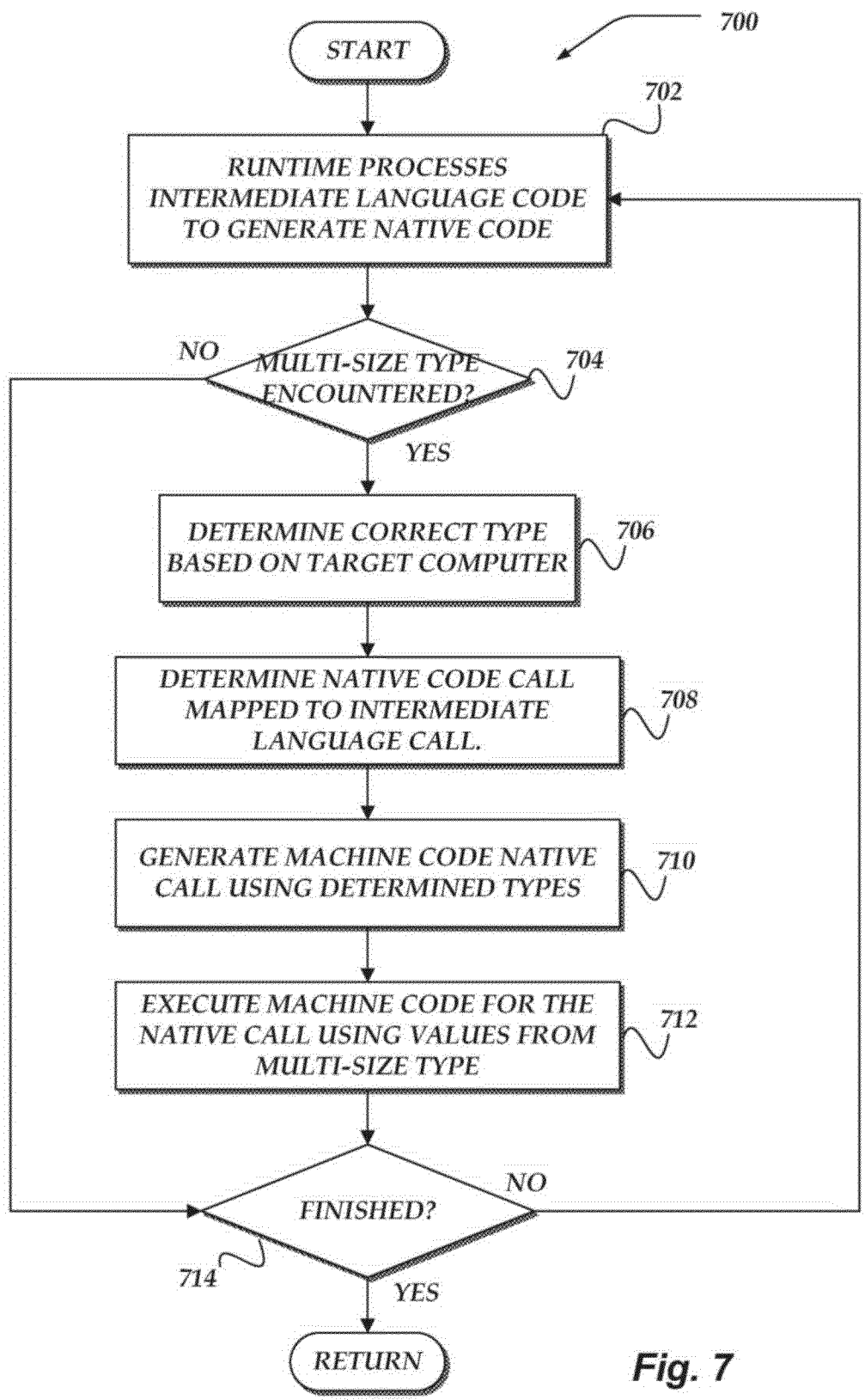

FIG. 5 shows table 500 as an example of mapping platform independent native types to target platform types in accordance with at least one of the various embodiments. In at least one of the various embodiments, one or more native types may be associated with specific types as defined in code generation environment to be mapped to specific data types in the native environment of the target platform.

In at least one of the various embodiments, during execution of an application a runtime engine may make calls to native functions and procedures of the target computer. These native functions may include various built-in services provided by the underlying target platform. Accordingly, the runtime engine may be required to map operations from intermediate language code into native operations. In this document, native operations may be referred to as machine code indicating that code may be generated for accessing native services provided by the target computer. Accordingly, machine code may include high-level and/or low-level system/service calls that may be provided by the target system. These service/system calls may often require particular data types to be provided by the runtime engine for passing parameters.

Accordingly, type mappings as shown in table 500 may be arranged. Table 500 illustrates one example of a mapping for at least one of the various embodiments. This example is illustrated as being compatible with code generating environment that uses an object-oriented programming language such as C#. Native type column 502 shows platform independent types that may support multiple sizes; column 504 shows size specific data types for 32-bit architectures; and column

506 shows size specific data types for 64-bit architectures. Likewise, row 508 shows types for signed integers; row 510 holds types for unsigned integers; and row 512 shows types for representing floating point numbers.

In at least one of the various embodiments, a native type shown in column 502 may be considered multi-sized because it may represent a 32-bit sized value or a 64-bit sized depending on the target computer an application is executed on. As discussed above, at execution time, the runtime engine may be arranged to replace a multi-sized (native) type with the specific sized type that is required for the target computer. At least one advantage of using multi-sized data types is that source code may be compiled into intermediate language code that may be executed an target platforms having different architectures (e.g., 32-bit versus 64-bit)

In at least one of the various embodiments, if the target computer does not support runtime code generation (e.g., some smart phones, game consoles, cable set-top boxes, or the like), the source code and its corresponding intermediate language code may be pre-compiled into an executable application before it is deployed to the target computer. If this is the case, the process of converting multi-size types (nints, nuints, nfloats) to target specific types may occur during the pre-compiling operation.

In at least one of the various embodiments, one or more frameworks and/or code libraries provided for use in source code may be arranged to use multi-size types. In some embodiments, each API call provided that would otherwise use a target computer dependent data type may be modified to employ correspondent multi-size data type. For example, API functions that include parameters having data types that vary in size depending on if the target computer uses a 32-bit architecture or a 64-bit architecture may be replaced with versions that use the multi-size types. Accordingly, in at least one of the various embodiments, if the runtime encounters these types during execution it may call underlying target computer function calls (native code call) using the correct size type.

Generalized Operation

Figure 6:
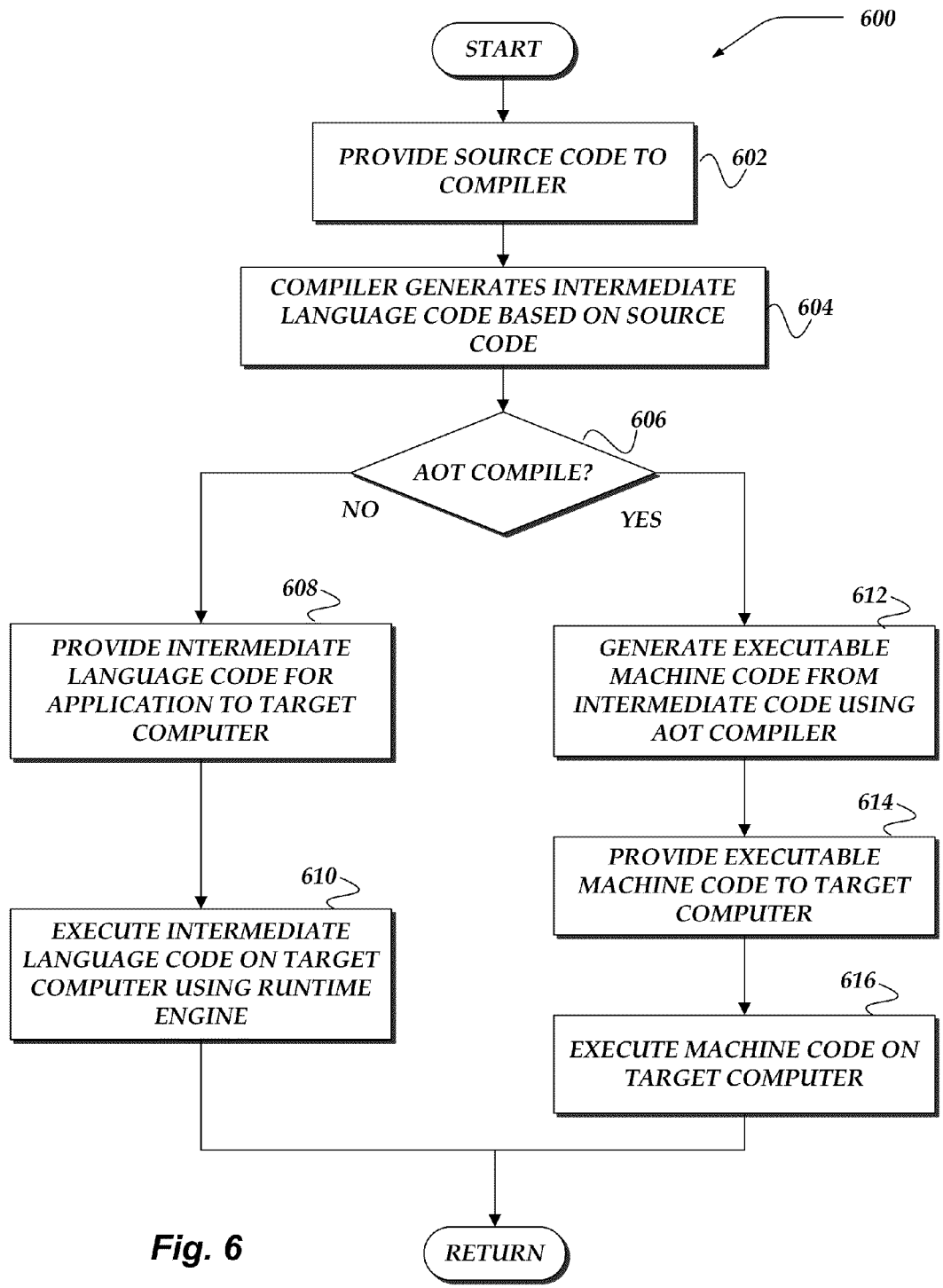
FIG. 6 shows an overview flowchart for a process using multi-size data types for managed code in accordance with at least one of the various embodiments.
Figure 7:
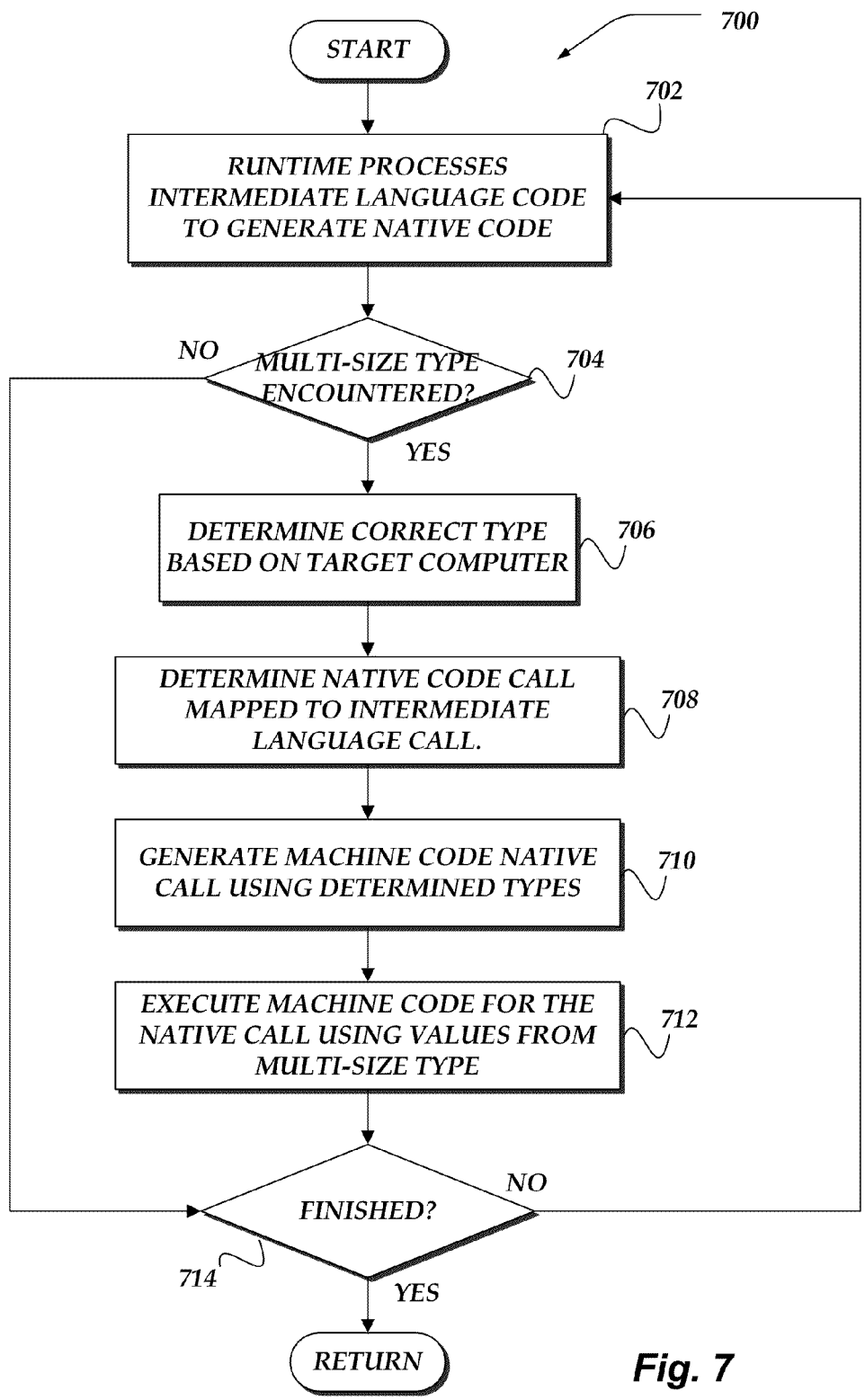
FIG. 7 illustrates an overview of a process for executing intermediate language code that include multi-sized types in accordance with at least one of the various embodiments.
Figure 1:
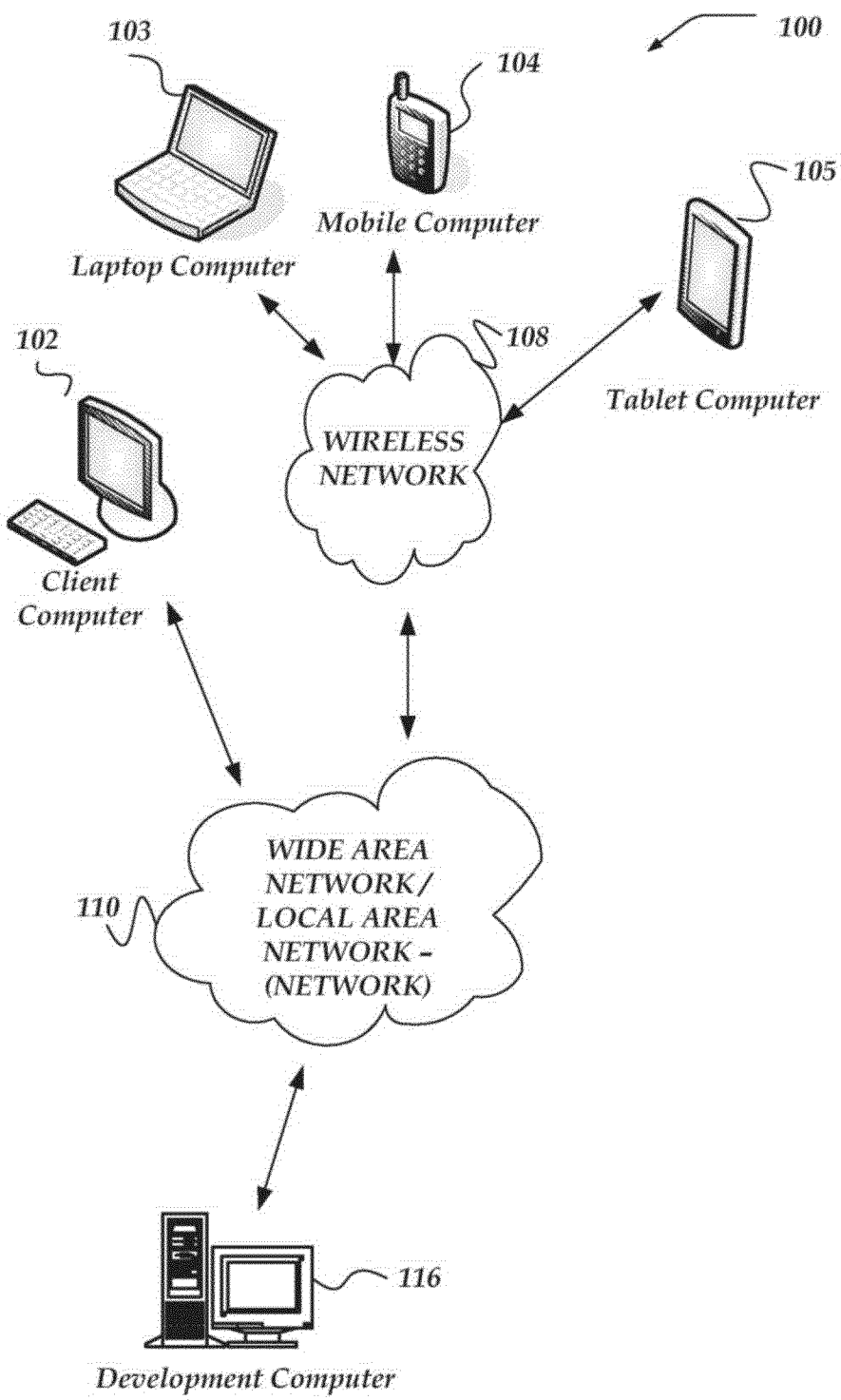
Figure 2:
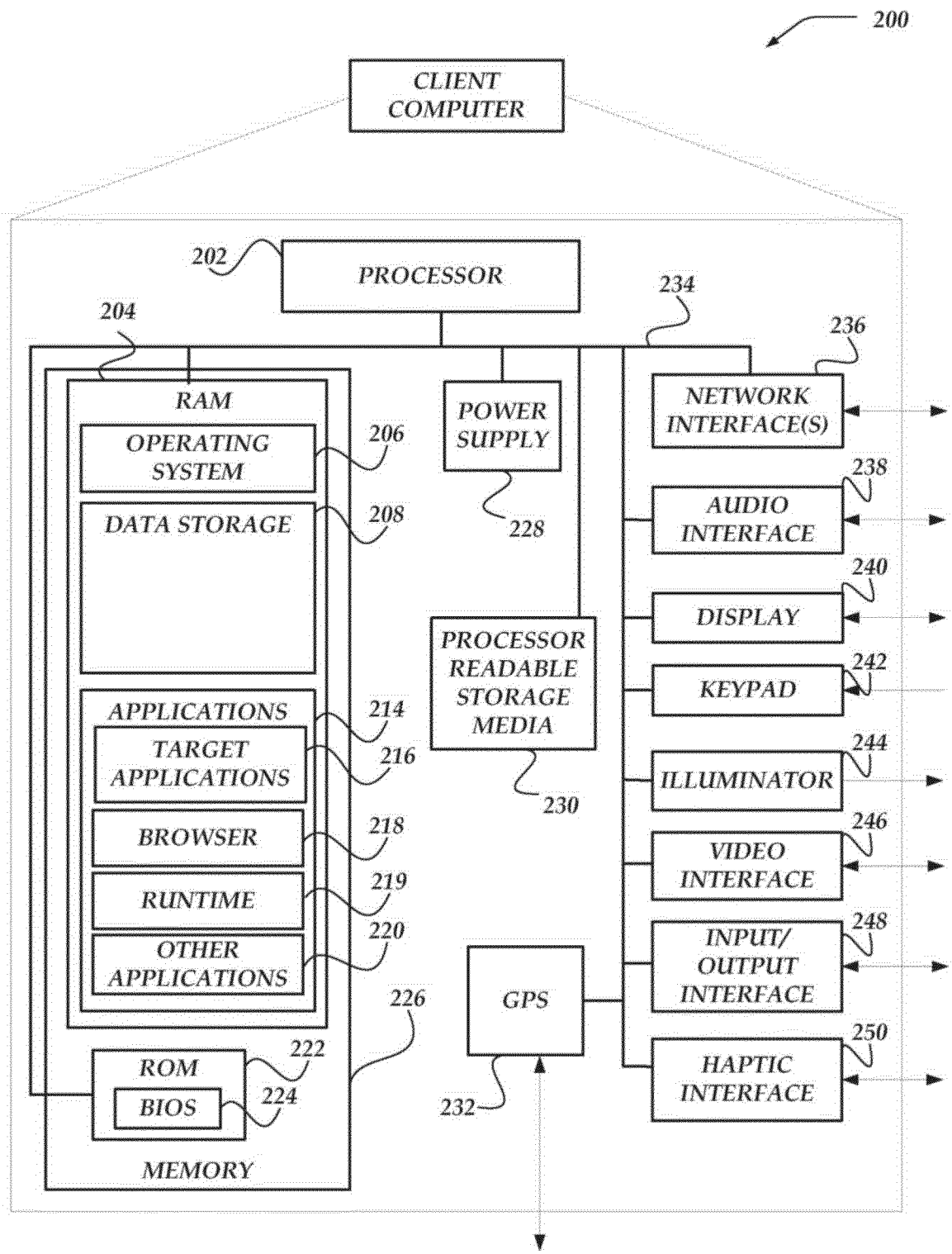
Figure 3:
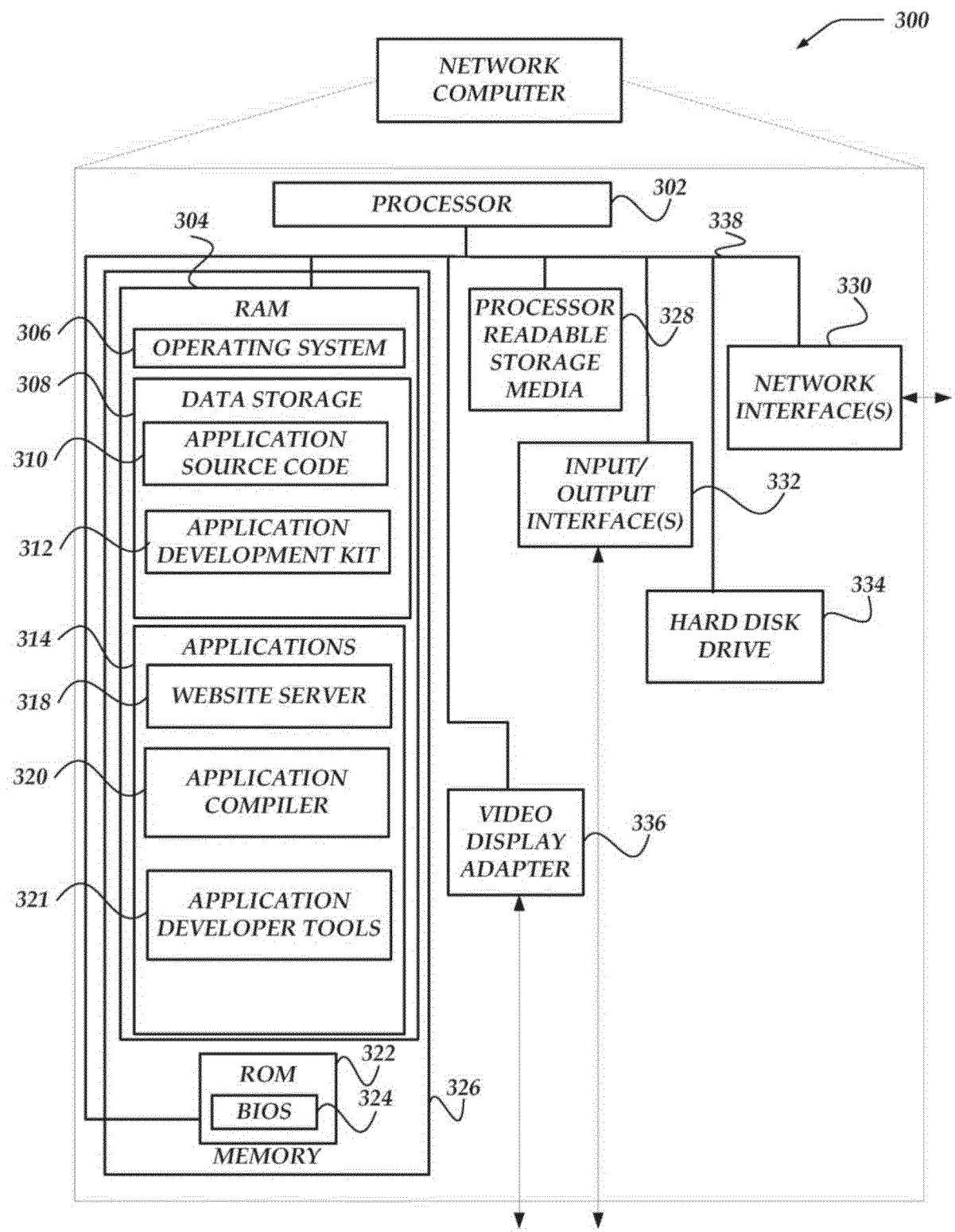
Figure 4A:
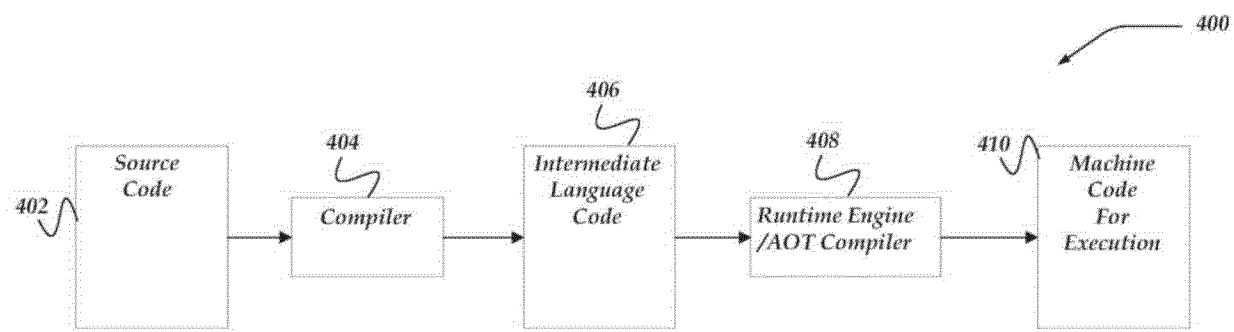
Figure 4B:
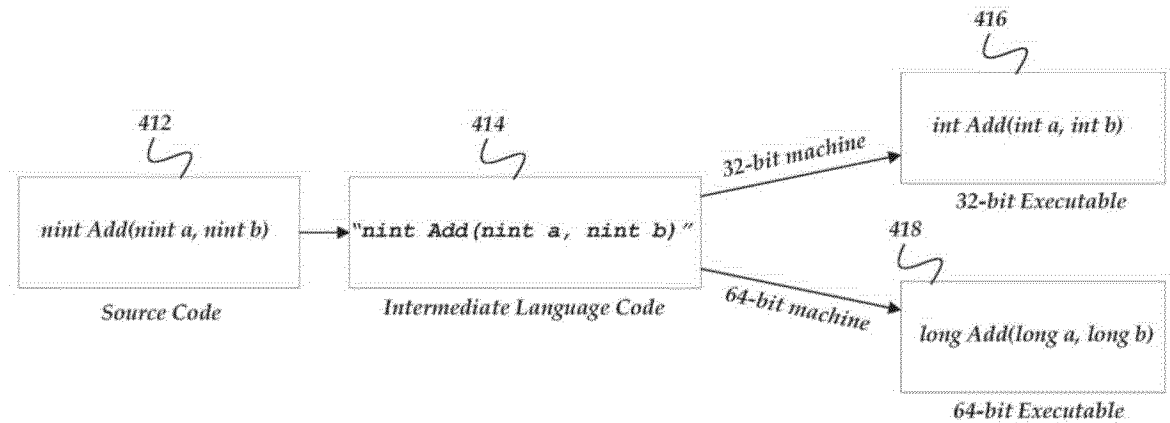

FIGS. 6-7 represent the generalized operations of generating application that may include generic function in accordance with at least one of the various embodiments. In at least one of the various embodiments, processes 600, and 700 described in conjunction with FIGS. 6-7 may be implemented by and/or executed on a single network computer, such as network computer 300 of FIG. 3. In other embodiments, these processes or portions of process thereof may be implemented by and/or executed on a plurality of network computers, such as network computer 300 of FIG. 3. Further, in at least one of the various embodiments, the processes described in conjunction with FIGS. 6-7 may be operative in generating and/or execution of machine code versions of applications as described in conjunction with FIGS. 4A and 4B and FIG. 5.

FIG. 6 shows an overview flowchart for process 600 using multi-size data types for managed code in accordance with at least one of the various embodiments. After a start block, at block 602, source code may be provided to a compiler. As described, source code files comprising an application may be provided to a compiler. In at least one of the various embodiments, the source code may comprise one or more files and/or documents.

At block 604, in at least one of the various embodiments, the compiler may generate intermediate language code based on the provided source code. In at least one of the various embodiments, the compiler may compile the source code into intermediate language code that is compatible with a particular runtime engine. In at least one of the various embodiments, compilers may be arranged to compiles various computer programming languages into intermediate language code for a runtime engine.

Accordingly, compilers may compile source code written in different languages for the same runtime engine. For example, source code may be written in various languages, such as, C#, Java, C, C++, F#, Visual Basic, or the like. A corresponding compiler may be designed to produce intermediate language code compatible with the same runtime engine for each language.

Likewise, in at least one of the various embodiments, intermediate language code may be arranged to be platform independent, such that, compiler generated intermediate language code may be compatible with runtime engines for different target computers.

At decision block 606, in at least one of the various embodiments, if the target platform requires ahead-of-time compiling, control may flow to block 612; otherwise, control may flow to block 608. As discussed above, some target computers may be restricted from employing JIT code generation. Accordingly, target computers that support JIT code generation may be handled differently that target computers that are restricted from using JIT code generation.

At block 608, in at least one of the various embodiments, the intermediate language code may be provided to the target platform. After the intermediate language code is generated it may be provided to a target computer. For many code generation environments the intermediate language code may be packaged and/or bundled for delivery—not unlike normal executable application may be provided to a target computer.

At block 610, in at least one of the various embodiments, the intermediate language code may be executed on the target platform using a runtime engine. A runtime engine that is arranged to generate and execute machine code for the target computer may be employed to generate and execute machine code correspondent to the provided intermediate language code. In practice, in at least one of the various embodiments, the target computer may be arranged/configured to automatically/transparently provide the intermediate language code to the runtime engine when a user or system process indicates that the intermediate language code should be executed. E.g., the provided intermediate language code may look like an executable application. And, if activated the runtime engine may be launched and provided the intermediate language code for execution. Next, control may be returned to a calling process.

At block 612, in at least one of the various embodiments, since the target computer may be restricted from performing onboard code generation, the intermediate language code for the application must be pre-compiled into machine code using an AOT compiler. In at least one of the various embodiments, the AOT compiler may be substantially similar to a runtime engine except that it may be arranged to compile the intermediate language code to executable machine code that may run as a standalone application on the target computer.

At block 614, in at least one of the various embodiments, the executable machine code comprising the application may be provided to the target computer. This may be accomplished by an installation procedure, or the like, similar to installing other executable applications on the target computer.

At block 616, in at least one of the various embodiments, the executable machine code application may be executed on the target computer. The executable machine code may be executed on the target computer just as other applications that may be located on the target computer (e.g., no runtime engine required). Next, control may be returned to a calling process.

FIG. 7 illustrates an overview of process 700 for executing intermediate language code that include multi-sized types in accordance with at least one of the various embodiments. After a start block, at block 702, in at least one of the various embodiments, the runtime engine on a target computer may process intermediate language code corresponding to an application to generate machine code for the target computer. As discussed above, applications developed in a code-generating environment may be executed by providing the intermediate language code that corresponds to the application to a runtime engine that generates and/or executes machine code based on the intermediate language code. As such, in at least one of the various embodiments, runtime engines may be designed to operate on specific target computers. Accordingly, while the intermediate language code may have some degree of platform independence, the runtime engine may be designed for a particular target platform and/or target computer.

At decision block 704, in at least one of the various embodiments, if a multi-size type is encountered by the runtime engine, control may flow to block 706 for further processing, otherwise, control may flow to decision block 714.

In at least one of the various embodiments, the runtime engine may be executing the application on the target computer by generating machine code in real-time (JIT compiling/code generation). During this process the runtime engine may determine that a pending intermediate language code operation includes one or more multi-sized data types. For example, the runtime engine may employ a type map such as shown in FIG. 5 for determining if a multi-size type is encountered. In some embodiments, the multi-size types may be indicated in the intermediate language code using abbreviated indicators, such as, flags, tags, or the like. Accordingly, if a multi-size type is identified, the runtime engine may take further action to disambiguate the type sizes.

In at least one of the various embodiments, the multi-size type may be included/embedded in a function call that maps to native function call for the target platform. In at least one of the various embodiments, the multi-size type may be a field in a higher level data structure, such as, a rectangle, coordinate point, or the like. Accordingly, the intermediate language code that includes such higher level data structures may have multi-size types embedded in those data structures.

At block 706, in at least one of the various embodiments, the runtime engine may determine the appropriate type based on the target computer. In at least one of the various embodiments, since the runtime engine arranged to operate on the target computer it will have access to target computer specific architecture information of the target computer for determining the word size, memory size, or the like, appropriate for the multi-size types. Alternatively, the runtime engine may be an application that is specifically targeted to the target computer so it may be configured with the architecture information embedded in the runtime engine. For example, the runtime engine may be arranged to determine if it is running on 32-bit, 64-bit, 128-bit, or the like, architecture target computer.

Further, in at least one of the various embodiments, the architecture information may be employed for determining addition information that may be used for generating the machine code calls, such as, calling conventions, byte word order (e.g., big endian, little endian), return value conventions, or the like.

At block 708, in at least one of the various embodiments, the native call that may be mapped to the intermediate language call may be determined. In at least one of the various embodiments, the runtime engine may determine the native call that is correspondent to the intermediate language code that is pending.

For example, if the intermediate language code corresponds to a function such as Add(nint a, nint b), the runtime may choose between native code functions Add(int a, int b) for 32-bit machines and Add(long a, long b) for 64-bit machines. Accordingly, it may make the determination of the function to execute based on the size information determined in block 708.

In at least one of the various embodiments, the determination of the appropriate function may be critical because some target computers may crash or otherwise generate an error if the parameters types are incorrect. For example, if the runtime engine generated code for calling Add (int a, int b) when the target computer expects Add(long a, long b) it may cause an error during runtime.

In at least one of the various embodiments, the runtime engine and/or the AOT compiler may determine the appropriate native code function (e.g., native code calls) by using a pattern matching engine that determines matches based on the name of the function and the architecture specific data types used for the particular architecture of the target computer.

At block 710, in at least one of the various embodiments, the machine code for the native call may be generated by the runtime engine. In this context, the machine code for the native call may be native function call provided by the target computer for performing the operations corresponding the intermediate language code. In at least one of the various embodiments, there may be a relatively close one-to-one mapping of source code functions to target computer functions. In other cases, for some embodiments, the runtime engine may generate multiple native function calls to implement to the operations corresponding to the source code/intermediate language code.

At block 712, in at least one of the various embodiments, the machine code for the native call may be executed using values provided using the multi-sized type parameters. In at least one of the various embodiments, the multi-size data type may be associated with data values. Thus, if the native call appropriate for the machine architecture of the target computer has been determined, the call may be executed by the runtime engine with values for the sized-parameters passed into the native function call.

In at least one of the various embodiments, the multi-size types may include a value property that hold a value for an instance of the multi-size type. For example, if nint a has a value of 1000 and nint b has a value of 200, for a runtime engine may execute the native function Add(1000, 200) using Add(int a, int b) for a 32-bit machine or Add(long a, long b) for a 64-bit machine.

Likewise, in at least one of the various embodiments, if the multi-size types are fields in a data structure, such as a rectangle, or coordinate point, the data structures may be replaced with a similar data structure that has the appropriate architecture specific data type. For example, a structure, such as, Rect (for rectangle) may be defined using multi-size types as such: Rect {nint x, nint y, nint height, nint width} accordingly for a 32-bit architecture Rect {int x, int y, int height, int width} would be used while for a 64-bit architecture Rect {long x, long y, long height, long width}, and so on.

Further, in at least one of the various embodiments, different architectures for target computers may require different calling conventions for passing arguments and received return values. Accordingly, the runtime engine may arrange the machine code to employ the specific calling conventions for the target platform.

At decision block 714, in at least one of the various embodiments, if the application is still running, control may loop back to block 702; otherwise, control may be returned a calling process. In at least one of the various embodiments, process 700 may be an ongoing operation whether it is performing just-in-time compiling/code generation or ahead-of-time compilation.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

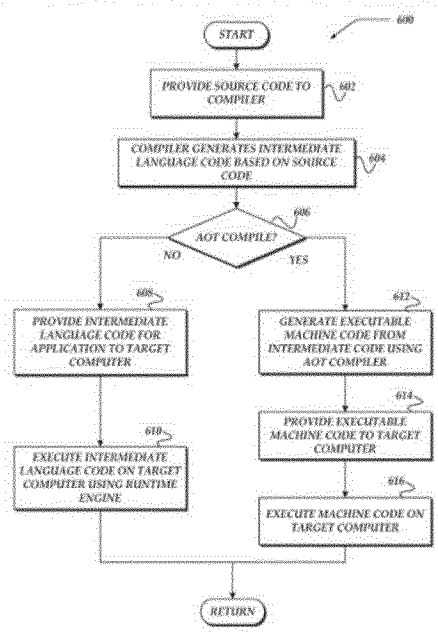

What is claimed as new and desired to be protected by Letters Patent of the United States is:

1. A method for generating an application using a computer that performs actions, including:
    responsive to encountering a multi-size type during compilation of an intermediate language version of the application into a machine code version of the application, performing actions, including:
        determining architecture information of a target computer, wherein the architecture information includes at least a word size of the target computer;
        determining one or more data types associated with the target computer that corresponds to the multi-sized type based on the architecture information;
        determining one or more native code calls that perform actions associated with an intermediate language code call, wherein parameters to the one or more native code calls match the one or more data types;
        generating a machine code version of the intermediate language code call that at least corresponds to the one or more determined native code calls and also corresponds to the architecture information;
    when the target computer enables just-in-time compiling, executing the generated machine code version of the intermediate language code call with one or more values correspondent to the multi-size type and the one or more data types by executing the one or more determined native code calls using the one or more determined data types that correspond to the architecture information; and
    when the target computer disables just-in-time compiling, inserting the generated machine code version of the intermediate language code call in the machine code version of the application with the one or more values correspondent to the multi-size type and the one or more data types, wherein the generated machine code version includes instructions to execute the one or more determined native code calls.

2. The method of claim 1, further comprising, generating the intermediate language code from one or more source code files, wherein the intermediate language code is deployable to a plurality of target platforms that have different architectures.

3. The method of claim 1, wherein the generated machine code version of the intermediate language code call, further comprises, a portion of machine code that corresponds to a calling convention supported by the target computer.

4. The method of claim 1, wherein determining the one or more native code calls that is associated with the intermediate language code call, further comprises, determining the one or more native codes call based on a pattern match that includes the one or more data types and a name of the one or more native code calls.

5. The method of claim 1, wherein the multi-size type is a field embedded in a data structure.

6. The method of claim 1, wherein the multi-size type corresponds to one of: an integer, an unsigned integer, or a floating point value.

7. The method of claim 1, wherein compiling the intermediate language version of the application into the machine code version of the application, further comprises, generating the machine code version using a runtime engine that is executing on the target computer, wherein the runtime engine enables just-in-time compilation of the machine code version of the application.

8. The method of claim 1, wherein determining the word size of the target computer of the target computer, further comprises, determining the word size to be one or more of 16-bits, 32-bits, 64-bits, or 128 bits.

9. A system for generating an application, comprising:
    a computer, including:
        a transceiver for communicating over the network;
        a memory for storing at least instructions; and
        a processor device that executes instructions that perform actions, including:
            responsive to encountering a multi-size type during compilation of an intermediate language version of the application into a machine code version of the application, performing actions, including:
                determining architecture information of a target computer, wherein the architecture information includes at least a word size of the target computer;

determining one or more data types associated with the target computer that corresponds to the multi-sized type based on the architecture information;

determining one or more native code calls that perform actions associated with an intermediate language code call, wherein parameters to the one or more native codes call match the one or more data types;

generating a machine code version of the intermediate language code call that at least corresponds to the one or more determined native code calls and also corresponds to the architecture information;

when the target computer enables just-in-time compiling, executing the generated machine code version of the intermediate language code call with one or more values correspondent to the multi-size type and the one or more data types by executing the one or more determined native code calls using the one or more determined data types that correspond to the architecture information; and when the target computer disables just-in-time compiling, inserting the generated machine code version of the intermediate language code call in the machine code version of the application with one or more values correspondent to the multi-size type and the one or more data types, wherein the generated machine code version includes instructions to execute the one or more determined native code calls; and a network computer, including:
a transceiver for communicating over the network;
a memory for storing at least instructions; and
a processor device that executes instructions that enable actions, including:
providing the intermediate language code version of the application to the computer.

10. The system of claim 9, wherein the computer's processor device performs actions, further comprising, generating the intermediate language code from one or more source code files, wherein the intermediate language code is deployable to a plurality of target platforms that have different architectures.

11. The system of claim 9, wherein the generated machine code version of the intermediate language code call, further comprises, a portion of machine code that corresponds to a calling convention supported by the target computer.

12. The system of claim 9, wherein determining the one or more native codes call that is associated with the intermediate language code call, further comprises, determining the one or more native codes call based on a pattern match that includes one or more data types and a name of the one or more one native code calls.

13. The system of claim 9, wherein the multi-size type is a field embedded in a data structure.

14. The system of claim 9, wherein the multi-size type corresponds to one of: an integer, an unsigned integer, or a floating point value.

15. The system of claim 9, wherein compiling the intermediate language version of the application into the machine code version of the application, further comprises, generating the machine code version using a runtime engine that is executing on the target computer, wherein the runtime engine enables just-in-time compilation of the machine code version of the application.

16. The system of claim 9, wherein determining the word size of the target computer of the target computer, further comprises, determining the word size to be one or more of 16-bits, 32-bits, 64-bits, or 128 bits.

17. A computer for generating an application, comprising:
a transceiver for communicating over the network;
a memory for storing at least instructions; and
a processor device that executes instructions performing actions, including:
responsive to encountering a multi-size type during compilation of an intermediate language version of the application into a machine code version of the application, performing actions, including:
determining architecture information of a target computer, wherein the architecture information includes at least a word size of the target computer;
determining at least one data type associated with the target computer that corresponds to the multi-sized type based on the architecture information;
determining one or more native codes call that perform actions associated with an intermediate language code call, wherein parameters to the one or more native codes call match the one or more data types;
generating a machine code version of the intermediate language code call that at least corresponds to the one or more determined native code calls and also corresponds to the architecture information;
when the target computer enables just-in-time compiling, executing the generated machine code version of the intermediate language code call with one or more values correspondent to the multi-size type and the one or more data types by executing the one or more determined native code calls using the one or more determined data types that correspond to the architecture information; and
when the target computer disables just-in-time compiling, inserting the generated machine code version of the intermediate language code call in the machine code version of the application with the one or more values correspondent to the multi-size type and the one or more data types, wherein the generated machine code version includes instructions to execute the one or more determined native code calls.

18. The computer of claim 17, wherein processor device performs actions, further comprising, generating the intermediate language code from one or more source code files, wherein the intermediate language code is deployable to a plurality of target platforms that have different architectures.

19. The computer of claim 17, wherein the generated machine code version of the intermediate language code call, further comprises, a portion of machine code that corresponds to a calling convention supported by the target computer.

20. The computer of claim 17, wherein determining the one or more native code calls that is associated with the intermediate language code call, further comprises, determining the one or more native code calls based on a pattern match that includes the one or more data types and a name of the one or more native code calls.

21. The computer of claim 17, wherein the multi-size type is a field embedded in a data structure.

22. The computer of claim 17, wherein the multi-size type corresponds to one of: an integer, an unsigned integer, or a floating point value.

23. The computer of claim 17, wherein compiling the intermediate language version of the application into the machine code version of the application, further comprises, generating the machine code version using a runtime engine that is executing on the target computer, wherein the runtime engine enables just-in-time compilation of the machine code version of the application.

24. A processor readable non-transitory storage media that includes instructions for generating an application, wherein a computer that executes at least a portion of the instructions performs actions, comprising:
   responsive to encountering a multi-size type during compilation of an intermediate language version of the application into a machine code version of the application, performing actions, including:
   determining architecture information of a target computer, wherein the architecture information includes at least a word size of the target computer;
   determining one or more data types associated with the target computer that corresponds to the multi-sized type based on the architecture information;
   determining one or more native code calls that perform actions associated with an intermediate language code call, wherein parameters to the one or more native codes call match the one or more data types;
   generating a machine code version of the intermediate language code call that at least corresponds to the one or more determined native code calls and also corresponds to the architecture information;
   when the target computer enables just-in-time compiling, executing the generated machine code version of the intermediate language code call with one or more values correspondent to the multi-size type and the one or more data types by executing the one or more determined native code calls using the one or more determined data types that correspond to the architecture information; and
   when the target computer disables just-in-time compiling, inserting the generated machine code version of the intermediate language code call in the machine code version of the application with the one or more values correspondent to the multi-size type and the one or more data types, wherein the generated machine code version includes instructions to execute the one or more determined native code calls.

25. The media of claim 24, further comprising, generating the intermediate language code from one or more source code files, wherein the intermediate language code is deployable to a plurality of target platforms that have different architectures.

26. The media of claim 24, wherein the generated machine code version of the intermediate language code call, further comprises, a portion of machine code that corresponds to a calling convention supported by the target computer.

27. The media of claim 24, wherein determining the one or more native code calls that is associated with the intermediate language code call, further comprises, determining the one or more native codes call based on a pattern match that includes the one or more data types and a name of the one or more native code calls.

28. The media of claim 24, wherein the multi-size type is a field embedded in a data structure.

29. The media of claim 24, wherein the multi-size type corresponds to one of: an integer, an unsigned integer, or a floating point value.

30. The media of claim 24, wherein compiling the intermediate language version of the application into the machine code version of the application, further comprises, generating the machine code version using a runtime engine that is executing on the target computer, wherein the runtime engine enables just-in-time compilation of the machine code version of the application.

* * * * *

UNITED STATES PATENT AND TRADEMARK OFFICE
CERTIFICATE OF CORRECTION

PATENT NO. : 9,183,020 B1
APPLICATION NO. : 14/537298
DATED : November 10, 2015
INVENTOR(S) : de Icaza et al.

It is certified that error appears in the above-identified patent and that said Letters Patent is hereby corrected as shown below:

On the Title Page

Substitute the title page with the title page that is shown attached.

In Item (56), under "OTHER PUBLICATIONS", in Column 2, Line 4, delete "Implemention" and insert -- Implementation --, therefor.

In the Drawings

Substitute the drawing figs. 1-7 with the drawing figs 1-7 that are shown attached.

Signed and Sealed this
Seventeenth Day of March, 2020

Andrei Iancu
*Director of the United States Patent and Trademark Office*

(12) United States Patent
de Icaza et al.

(10) Patent No.: US 9,183,020 B1
(45) Date of Patent: Nov. 10, 2015

(54) MULTI-SIZED DATA TYPES FOR MANAGED CODE

(71) Applicant: Xamarin Inc., San Francisco, CA (US)

(72) Inventors: Miguel de Icaza, Boston, MA (US); Rodrigo Kumpera, Boston, MA (US); Sebastien Pouliot, Quebec City (CA); Rolf Bjarne Kvinge, Madrid (ES); Aaron Dean Bockover, Raleigh, NC (US); Zoltan Varga, Budapest (HU)

(73) Assignee: Xamarin Inc., San Francisco, CA (US)

(*) Notice: Subject to any disclaimer, the term of this patent is extended or adjusted under 35 U.S.C. 154(b) by 0 days.

(21) Appl. No.: 14/537,298

(22) Filed: Nov. 10, 2014

(51) Int. Cl.
 *G06F 9/45* (2006.01)
 *G06F 9/455* (2006.01)

(52) U.S. Cl.
 CPC ............ *G06F 9/4552* (2013.01); *G06F 8/41* (2013.01); *G06F 8/437* (2013.01)

(58) Field of Classification Search
 CPC .... G06F 8/437; G06F 9/4552; G06F 9/45525
 USPC ........................................ 717/146–148, 152
 See application file for complete search history.

(56) References Cited

U.S. PATENT DOCUMENTS

| | | | |
|---|---|---|---|
| 5,280,617 A | 1/1994 | Brender et al. | |
| 5,493,675 A | 2/1996 | Faiman, Jr. et al. | |
| 6,389,590 B1 * | 5/2002 | Miller et al. | 717/140 |
| 8,006,239 B2 | 8/2011 | Sankaranarayanan et al. | |
| 8,245,210 B2 | 8/2012 | Ng et al. | |
| 2003/0093780 A1 | 5/2003 | Freudenberger et al. | |
| 2003/0126590 A1 | 7/2003 | Burrows et al. | |
| 2005/0132328 A1 | 6/2005 | Bulusu | |
| 2008/0320453 A1 | 12/2008 | Meijer et al. | |
| 2010/0287536 A1 | 11/2010 | Chung et al. | |

OTHER PUBLICATIONS

Office Communication for U.S. Appl. No. 14/337,064 mailed on Sep. 9, 2014.
Achten et al., "When Generic Functions Use Dynamic Values", 2002, Proceedings of the 14th International Conference on Implementation of Functional Languages, pp. 17-33.
Office Communication for U.S. Appl. No. 14/337,064 mailed on Sep. 9, 2014 (21 pages).

(Continued)

*Primary Examiner* — Ryan Coyer
(74) *Attorney, Agent, or Firm* — John W. Branch; Lowe Graham Jones PLLC

(57) ABSTRACT

Embodiments are directed towards generating applications that include multi-sized types running in managed code. During the compilation of an intermediate language version of an application, if a multi-size type is encountered, a runtime engine may perform actions to process the multi-size types. Accordingly, architecture information associated with the target computer may be determined. Data types corresponding to the architecture of the target computer and the multi-sized types may be determined based on the architecture information. Native code calls associated with an intermediate language code calls may be determined such that the parameters of the native code calls match the architecture dependent data types. And, a machine code version of the intermediate language code call may be generated. The generated machine code version of the intermediate language code may be executed with the data types specific to the target computer.

30 Claims, 7 Drawing Sheets